J. A. LARSON.
GLASS FLOAT.
APPLICATION FILED APR. 21, 1917.

1,257,890.

Patented Feb. 26, 1918.

WITNESSES

INVENTOR
John A. Larson
BY
ATTORNEYS

UNITED STATES PATENT OFFICE.

JOHN A. LARSON, OF BROOKLYN, NEW YORK.

GLASS FLOAT.

1,257,890.  Specification of Letters Patent.  Patented Feb. 26, 1918.

Application filed April 21, 1917. Serial No. 163,539.

*To all whom it may concern:*

Be it known that I, JOHN A. LARSON, a citizen of the United States, and a resident of the city of New York, borough of Brooklyn, in the county of Kings and State of New York, have invented a new and Improved Glass Float, of which the following is a full, clear, and exact description.

The invention relates to floats, such as are used in flushing tanks and the like containing water or other liquid and controlling the inflow or the outflow of the liquid.

The object of the invention is to provide a new and improved float made of glass or other similar vitreous material and provided with fastening means for attaching the float to a lever or other device to be actuated by the float rising and falling with the level of the water in the tank.

Another object of the invention is to firmly unite the fastening or attaching member of the float during the making of the glass float body to prevent the attaching means from becoming loose or detached even on rough handling of the float or the apparatus in which it is installed.

In order to accomplish the desired result, use is made of a hollow float provided with a metallic attaching member having integral retaining studs embodied in the float material.

A practical embodiment of the invention is represented in the accompanying drawings forming a part of this specification, in which similar characters of reference indicate corresponding parts in both views.

The hollow body 10 of the float is made of glass or similar material and is preferably in the form of a sphere. The metallic means for attaching the float body 10 to a rod, lever or other device consists of a hub 11, preferably threaded interiorly to screw onto the rod, lever or other device to be actuated by the float. The hub 11 rises centrally from a metallic plate 12, preferably triangular in shape and provided at its corners with integral inwardly extending studs 13 arranged in converging relation one to the other.

Figure 1:
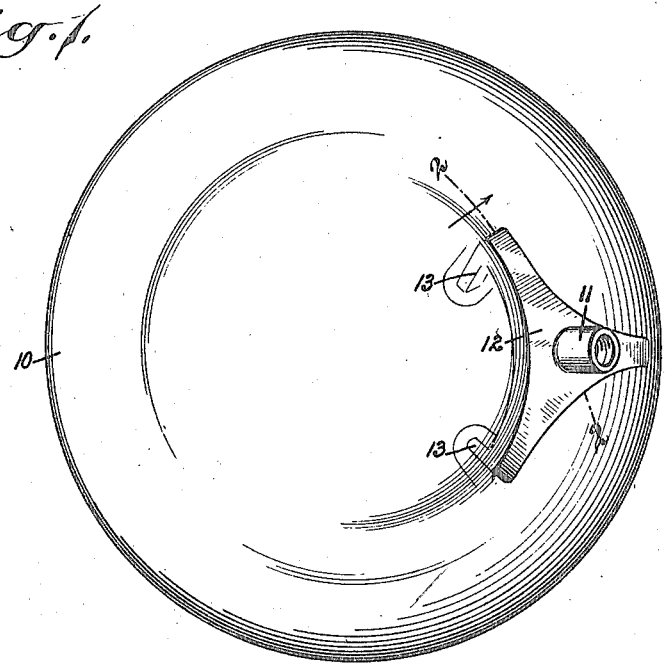
Figure 1 is a perspective view of the float.
Figure 2:
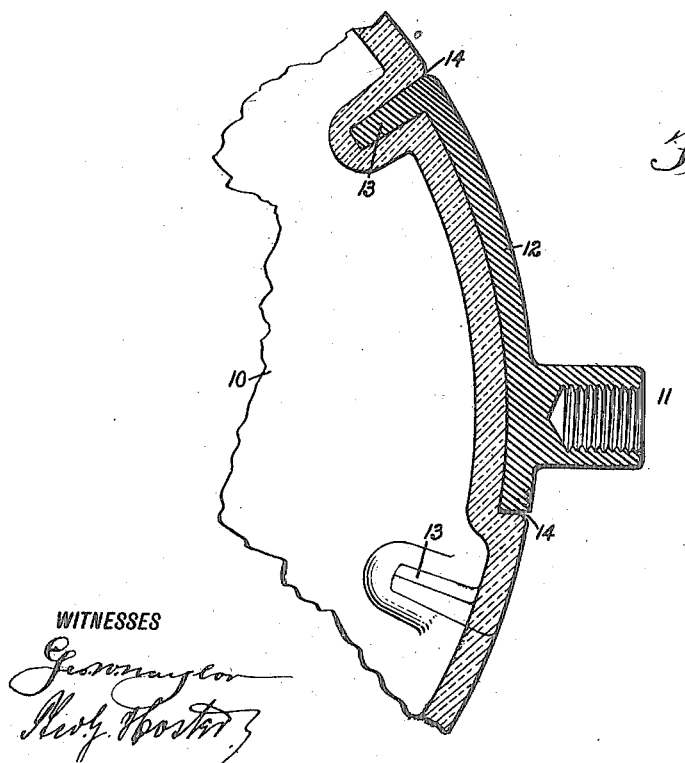
Fig. 2 is a sectional side elevation of the same.

The plate 12 fits into a depression or a recess 14 formed in the surface of the float body 10, and the outer face of the plate 12 is approximately flush with the surface of the float body 10. The studs 13 are embedded in the material of the float body 10, as plainly indicated in Fig. 2, and by having the said studs converging it is evident that the plate 12 is securely held in position on the float body.

In making the hollow body 10 in a mold the plate 12 with its studs 13 is placed in position in the mold and becomes embedded in the glass during the making of the float body. It will be noticed that by this arrangement no other fastening means are required to securely attach the metallic attaching member to the body of the float.

A float constructed in the manner described can be readily attached to the means to be actuated by the float and the attaching member is not liable to become loose or disconnected from the float body.

Having thus described my invention, I claim as new and desire to secure by Letters Patent:—

1. As an article of manufacture, a hollow spherical float provided with a metallic arcuate attaching member fitting the surface of the float and having integral retaining studs extending inwardly and embedded in the float material during the making of the float.

2. As an article of manufacture, a hollow float of vitreous material and provided with a metallic attaching member having a hub and a plate integral with the hub and terminating in angular studs embedded in the vitreous material during the making of the float.

3. As an article of manufacture, a hollow float of vitreous material and provided with a metallic attaching member having a hub, and an arcuate plate integral with the hub and extending in a recess in the surface of the float, the plate having integral studs and extending inwardly in converging relation to each other and embedded in the vitreous material.

JOHN A. LARSON.

Copies of this patent may be obtained for five cents each, by addressing the "Commissioner of Patents, Washington, D. C."